United States Patent
Shibuya

(10) Patent No.: US 9,830,538 B2
(45) Date of Patent: Nov. 28, 2017

(54) IMAGE FORMING APPARATUS THAT RESTRICTS RECEPTION OF PRINT JOB BASED ON A TYPE OF A PREVIOUSLY RECEIVED PRINT JOB AND CONTROL METHOD THEREFOR

(71) Applicant: CANON KABUSHIKI KAISHA, Tokyo (JP)

(72) Inventor: Yuichiro Shibuya, Abiko (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/843,315

(22) Filed: Sep. 2, 2015

(65) Prior Publication Data
US 2016/0070521 A1    Mar. 10, 2016

(30) Foreign Application Priority Data
Sep. 9, 2014    (JP) .................................. 2014-183301

(51) Int. Cl.
*G06F 3/12*    (2006.01)
*G06K 15/02*    (2006.01)

(52) U.S. Cl.
CPC ......... *G06K 15/1813* (2013.01); *G06F 3/122* (2013.01); *G06F 3/1263* (2013.01); *G06F 3/1267* (2013.01); *G06F 3/1285* (2013.01)

(58) Field of Classification Search
None
See application file for complete search history.

(56) References Cited

U.S. PATENT DOCUMENTS

| 2006/0282638 | A1* | 12/2006 | Oshima | G06F 3/0622 711/170 |
| 2011/0255133 | A1* | 10/2011 | Pastor | G06K 15/4005 358/1.16 |
| 2012/0013942 | A1* | 1/2012 | Kuwahara | G06F 3/1204 358/1.15 |
| 2013/0003124 | A1* | 1/2013 | Yamazaki | G03G 15/655 358/1.15 |
| 2014/0293344 | A1* | 10/2014 | Umezawa | G03G 15/5016 358/1.15 |
| 2015/0022862 | A1* | 1/2015 | Ataka | G03G 21/14 358/1.17 |

FOREIGN PATENT DOCUMENTS

JP    10264455 A    10/1998

* cited by examiner

*Primary Examiner* — Andrew H Lam
(74) *Attorney, Agent, or Firm* — Rossi, Kimms & McDowell LLP

(57) ABSTRACT

An image forming apparatus which is capable of efficiently executing print jobs. The image forming apparatus receives a second print job after receiving a first print job and prints a plurality of copies of print data corresponding to the first print job. Whether or not the print data is to be printed by sort printing is determined, and when the print data is to be printed by sort printing, reception of the second print job is restricted until printing of the print data is completed, and when the print data is not to be printed by sort printing, reception of the second print job is not restricted even before printing of the print data is completed.

21 Claims, 8 Drawing Sheets

IMAGE FORMING APPARATUS THAT RESTRICTS RECEPTION OF PRINT JOB BASED ON A TYPE OF A PREVIOUSLY RECEIVED PRINT JOB AND CONTROL METHOD THEREFOR

BACKGROUND OF THE INVENTION

Field of the Invention

The present invention relates to an image forming apparatus, a control method for the image forming apparatus, and a storage medium.

Description of the Related Art

An image forming apparatus receives a plurality of PDL (page description language) jobs which are print jobs. When the received plurality of PDL jobs are successively stored in a memory which the image forming apparatus has, the free space of the memory may be exhausted to cause shortage of memory for executing the PDL jobs, and therefore, the PDL jobs may not be executed.

To cope with this, there are known image forming apparatuses which, upon receiving a PDL job, restrict reception of other PDL jobs so as to allocate memory for executing the received PDL job (see, for example, Japanese Laid-Open Patent Publication (Kokai) No. H10-264455).

Printing methods for use when an image forming apparatus prints a plurality of copies of print data corresponding to a PDL job include group printing in which a plurality of copies of print data are printed on a page-by-page basis, and sort printing in which a plurality of copies of print data are printed on a copy-by-copy basis. To perform printing of print data by group printing, the image forming apparatus stores print data on one page to be printed in a memory and performs printing of the print data stored in the memory. It is thus unnecessary to store print data on all pages to be printed in the memory at a time, and therefore, enough space of the memory which the image forming apparatus has is easily secured.

On the other hand, to perform printing of print data by sort printing, the image forming apparatus stores print data on all pages to be printed in the memory at a time. Therefore, when print data is printed by sort printing, a shortage of the free space of the memory which the image forming apparatus has tends to occur, and a PDL job may not be executed.

However, the image forming apparatus described in Japanese Laid-Open Patent Publication (Kokai) No. H10-264455 restricts reception of other PDL jobs irrespective of which printing method is used. Namely, the image forming apparatus described in Japanese Laid-Open Patent Publication (Kokai) No. H10-264455 excessively restricts reception of other PDL jobs and thus does not efficiently execute print jobs.

SUMMARY OF THE INVENTION

The present invention provides an image forming apparatus which is capable of efficiently executing print jobs, a control method for the image forming apparatus, and a storage medium.

Accordingly, the present invention provides an image forming apparatus that receives a second print job after receiving a first print job and prints a plurality of copies of print data corresponding to the first print job, comprising a determination unit configured to determine whether the print data is to be printed by sort printing, and a restriction unit configured to, when said determination unit determines that the print data is to be printed by sort printing, restrict reception of the second print job until printing of the print data is completed, and when said determination unit determines that the print data is not to be printed by sort printing, not restrict reception of the second print job even before printing of the print data is completed.

According to the present invention, when a print job is to be executed by sort printing, reception of other print jobs is restricted until printing of the print job is completed. On the other hand, when a print job is not to be executed by sort printing, reception of other print jobs is not restricted. As a result, print jobs are efficiently executed.

Further features of the present invention will become apparent from the following description of exemplary embodiments (with reference to the attached drawings).

DESCRIPTION OF THE EMBODIMENTS

The present invention will now be described with reference to the drawings showing embodiments thereof.

First, a description will be given of a first embodiment of the present invention.

Figure 1:
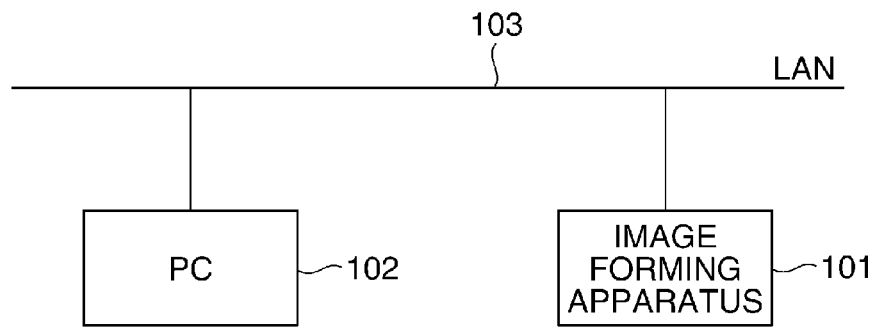
FIG. 1 is a block diagram schematically showing an arrangement of an image forming system including an image forming apparatus according to a first embodiment of the present invention.

FIG. 1 is a block diagram schematically showing an arrangement of an image forming system 100 including an image forming apparatus 101 according to the first embodiment of the present invention.

The image forming system 100 in FIG. 1 has the image forming apparatus 101 and a PC 102, and the image forming apparatus 101 and the PC 102 are connected together via a LAN 103. A user operates the PC 102 to instruct the image forming apparatus 101 to, for example, execute a PDL job which is a print job. The image forming apparatus 101 receives a PDL job and forms an image on a recording sheet based on the PDL job.

Figure 2:
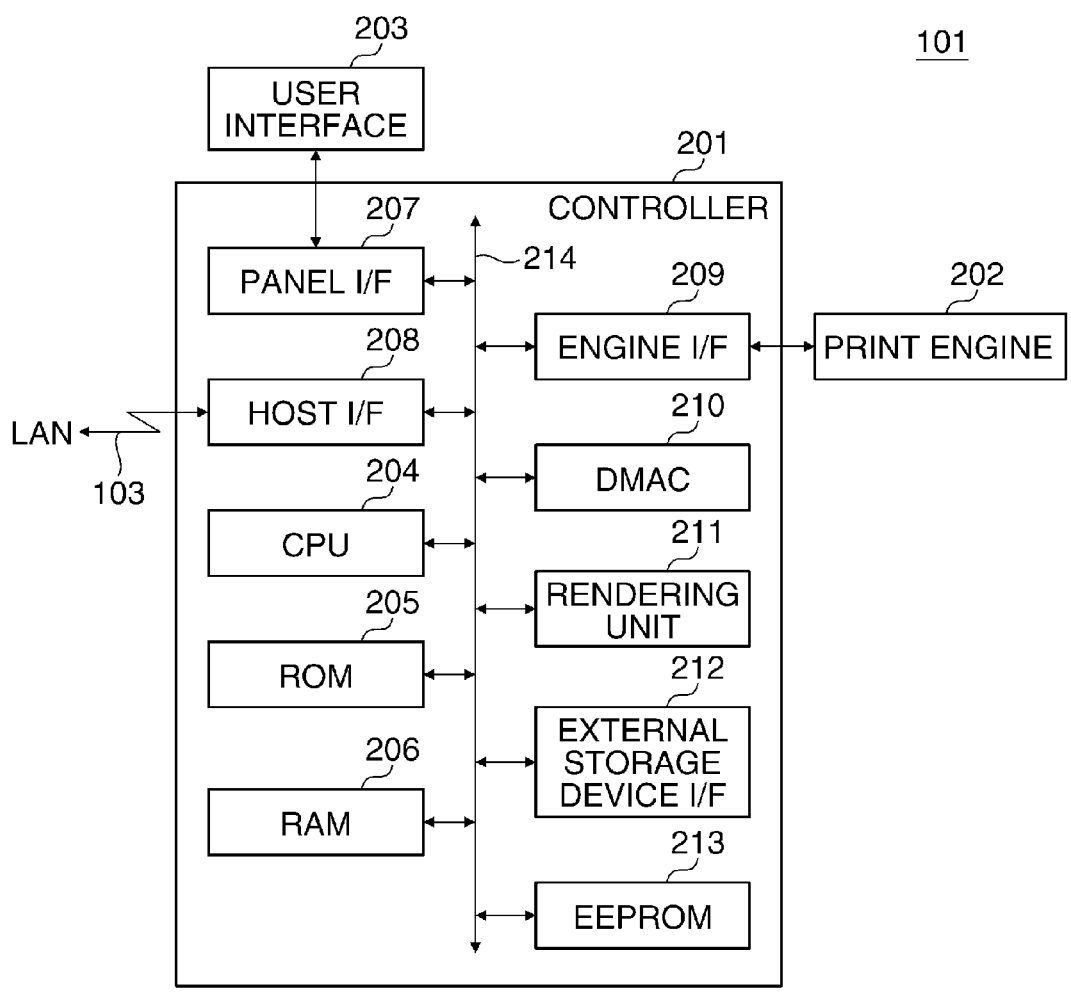
FIG. 2 is a block diagram schematically showing an internal arrangement of the image forming apparatus in FIG. 1.

FIG. 2 is a block diagram schematically showing an arrangement of the image forming apparatus 101 in FIG. 1.

The image forming apparatus 101 in FIG. 2 has a controller 201, a print engine 202, and a user interface 203. The controller 201 has a CPU 204, a ROM 205, a RAM 206, a panel I/F 207, a host I/F 208, an engine I/F 209, a DMAC 210, a rendering unit 211, an external storage device I/F 212, and an EEPROM 213. These component elements are connected to one another via a bus 214.

The print engine 202 receives bitmap data from the controller 201 and prints bitmap data on a recording sheet. The bitmap data is printed on a recording sheet using an electrophotographic printing method, an inkjet printing method, or the like. The user interface 203 has hardware keys, an operating panel, and so on, and a user inputs instructions to the image forming apparatus 101 through the hardware keys and the operating panel. It should be noted that the operating panel may have, for example, a liquid crystal monitor, and for example, information on the image forming apparatus 101 is displayed on the liquid crystal monitor.

The CPU 204 expands programs stored in the ROM 205 into the RAM 206 and executes the programs to control the image forming apparatus 101. The ROM 205 stores programs, which are executed by the CPU 204, and others. The RAM 206 is a work memory for the CPU 204 and stores programs expanded from the ROM 205. The RAM 206 also stores PDL data which PDL jobs have, intermediate data generated from the PDL data, bitmap data generated from the intermediate data, log information, and so on.

The panel I/F 207 connects the controller 201 and the user interface 203 together, the host I/F 208 connects the LAN 103 and the controller 201 together, and the engine I/F 209 connects the controller 201 and the print engine 202 together. The DMAC 210 writes data into the RAM 206 or reads out data from the RAM 206. The rendering unit 211 converts intermediate data, which is generated from PDL data, into bitmap data. The external device I/F 212 connects the controller 201 and a removable external storage device (not shown) together. The EEPROM 213 stores, for example, setting information on the image forming apparatus 101.

Figure 3:
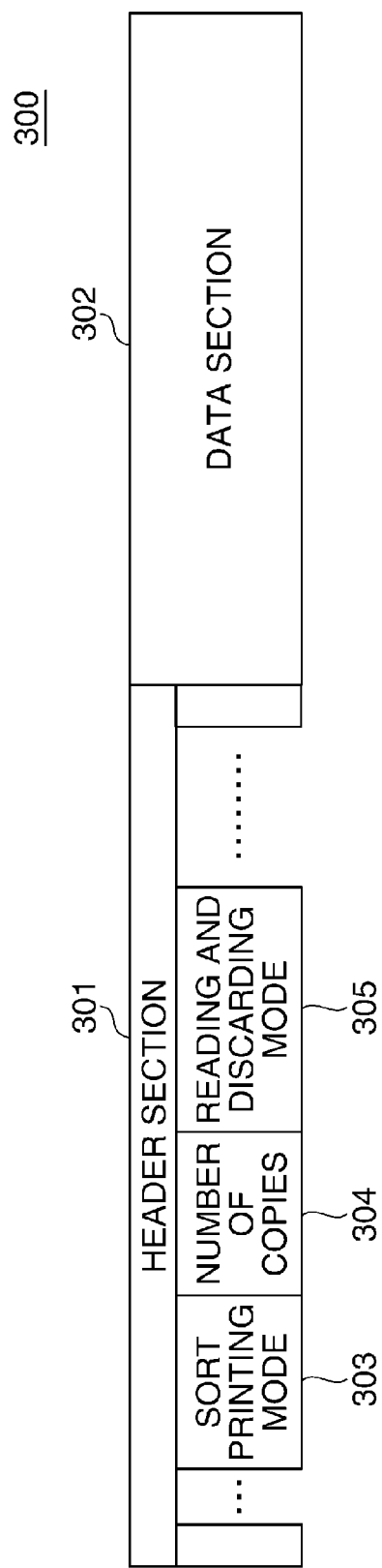
FIG. 3 is a diagram useful in explaining a structure of a PDL job which is received by the image forming apparatus in FIG. 1.

FIG. 3 is a diagram useful in explaining an arrangement of a PDL job 300 which is received by the image forming apparatus 101 in FIG. 1.

The PDL job 300 in FIG. 3 has a header section 301 and a data section 302. The header section 301 has attribute information on the PDL job 300 such as a sort printing mode 303, the number of copies 304, or a reading and discarding mode 305. The data section 302 stores PDL data. The rendering section 211 generates bitmap data based on PDL data. The sort printing mode 303 indicates whether or not a sort printing mode in which a plurality of copies of bitmap data generated based on PDL data stored in the data section 302 are printed by sort printing is selected, and the number of copies 304 indicates the number of print copies to be made from the bitmap data.

The reading and discarding mode 305 indicates whether or not a reading and discarding mode in which the PDL job 300 is stored in a storage area 404, to be described later, and when reading of the data section 302 is completed, the PDL job 300 is deleted from the storage area 400 even if printing of bitmap data has not been completed is selected. Usually, the reading and discarding mode is not selected when a plurality of copies of bitmap data are to be printed by sort printing, but is selected when a plurality of copies of bitmap data are to be printed by, for example, group printing, not by sort printing.

Figure 4A:
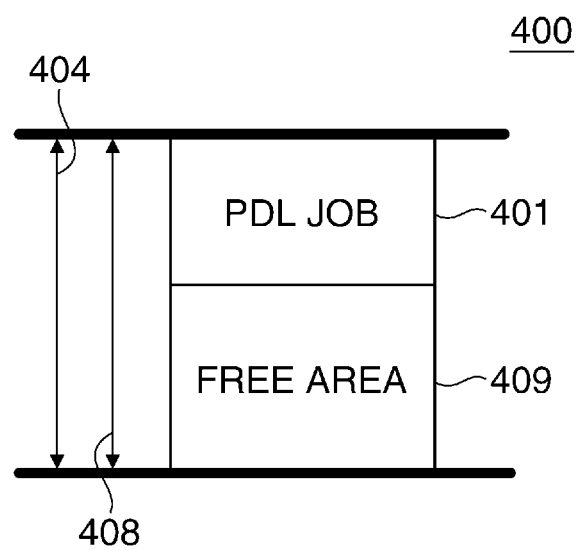
FIGS. 4A and 4B are diagrams useful in explaining a structure of a storage area in which the PDL job in FIG. 3 is stored.
Figure 4B:
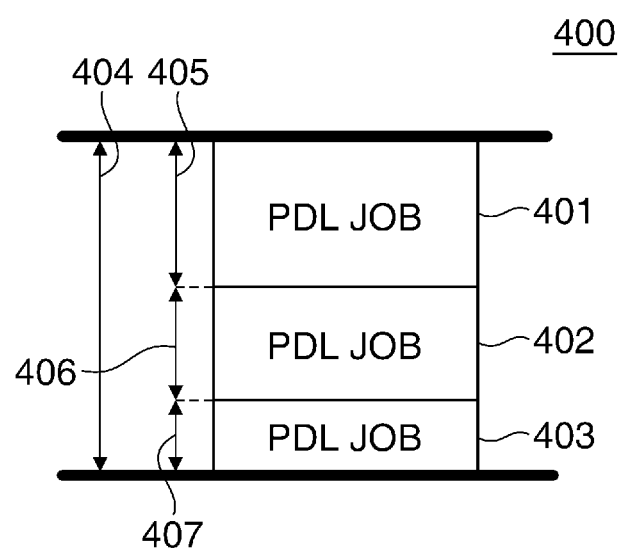

FIGS. 4A and 4B are diagrams useful in explaining a structure of the storage area 400 in which the PDL job 300 in FIG. 3 is stored. In the present embodiment, for example, the RAM 206 has the storage area 400.

When the image forming apparatus 101 receives, for example, only one PDL job 401 (FIG. 4A), the PDL job 401 is stored in a job storage area 408 having the same capacity as an overall capacity 404 of the storage area 400. The PDL job 401, however, does not have such an amount as to occupy the entire job storage area 408, and hence the job storage area 408 stores the PDL job 401 and also has a free space 409.

Also, upon receiving, for example, the PDL job 401, a PDL job 402, and a PDL job 403 (FIG. 4B) in succession, the image forming apparatus 101 stores these PDL jobs 401 to 403 in the storage area 400 in the order in which the PDL jobs 401 to 403 were received. At this time, the PDL jobs 401 to 403 are stored in job storage areas 405 to 407, respectively, which are formed by dividing the storage area 400 and have smaller capacities than the overall capacity 404 of the storage area 400.

In the example shown in FIG. 4B, when the PDL jobs 401 to 403 are successively received, the overall capacity 404 of the storage area 400 is filled with the job storage areas 405 to 407. For this reason, there is not enough capacity of the storage area 400 required to execute the PDL jobs 401 to 403, and the PDL jobs 401 to 403 are not efficiently executed. On the other hand, in the example shown in FIG. 4A, the job storage area 408 has the free space 409, and hence the PDL job 401 is efficiently executed. Therefore, in the case shown in FIG. 4A, the PDL job 401 is efficiently executed even when the sort printing mode is selected for the PDL job 401.

Figure 5:
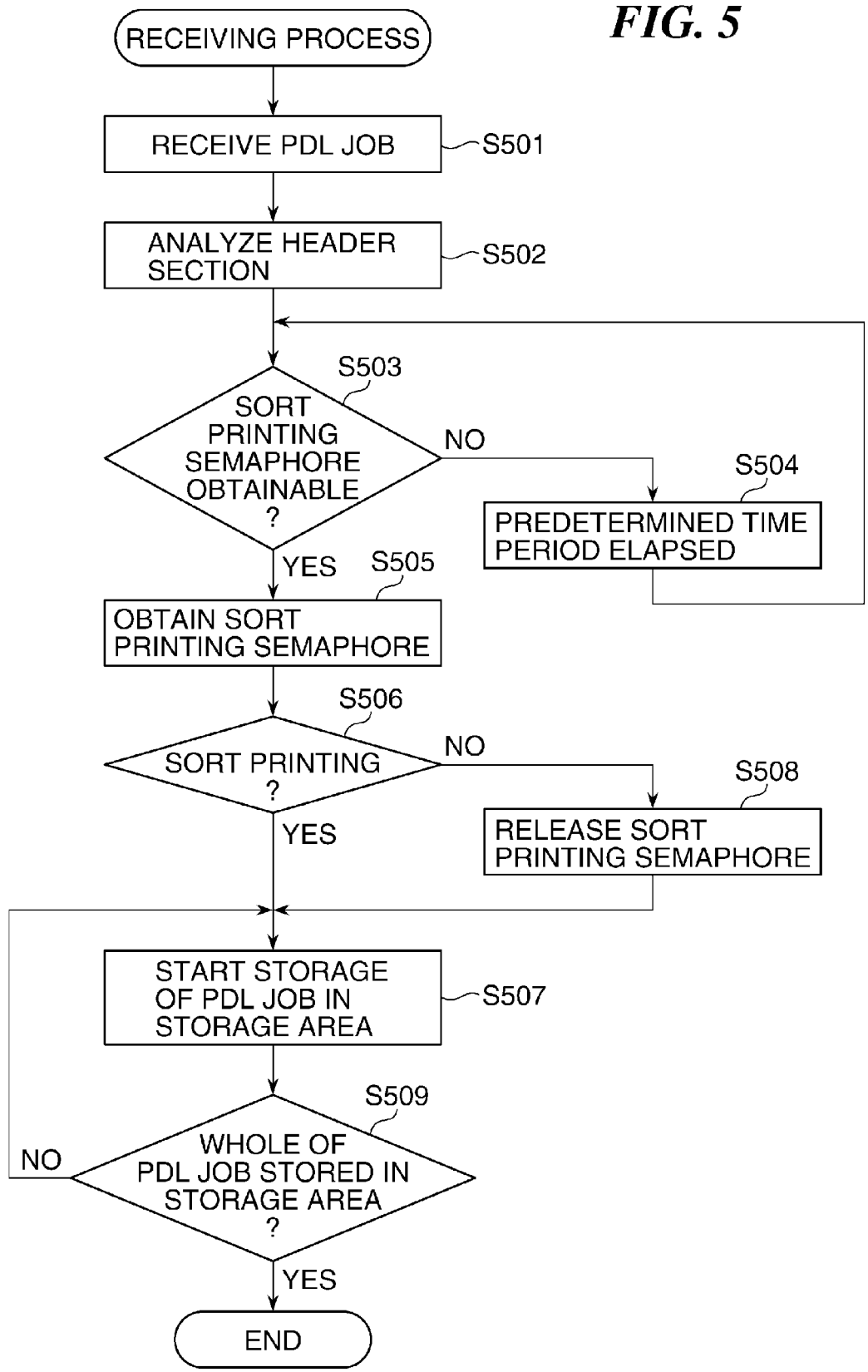
FIG. 5 is a flowchart showing the procedure of a receiving process which is carried out by a CPU of the image forming apparatus in FIG. 2.

FIG. 5 is a flowchart showing the procedure of a receiving process which is carried out by the CPU 204 of the image forming apparatus in FIG. 2.

Referring to FIG. 5, first, the CPU 204 receives the PDL job 300 sent from the PC 102 (step S501), analyzes the header section 301, which the received PDL job 300 has, and stores attribute information on the PDL job 300 such as the sort printing mode 303 and the number of copies 304 in the RAM 206 (step S502), and determines whether or not it is possible to obtain a sort printing semaphore (step S503).

Here, a semaphore is a function of controlling an interrupt process in which when a certain process is being carried out, it is interrupted by another process, and a sort printing semaphore is a semaphore which is used when the sort printing mode is selected. Specifically, in a case where a sort printing semaphore is obtained, and the sort printing mode is selected when one PDL job is to be executed, reception of other PDL jobs is restricted until execution of the PDL job is completed, and the obtained sort printing semaphore is released. On the other hand, in a case where no sort printing semaphore has been obtained when one PDL job is to be executed, reception of other PDL jobs is not restricted even before printing of print data is completed.

When the CPU 204 determines in the step S503 that it is not possible to obtain a sort printing semaphore, the process returns to the step S503 after a predetermined time period has elapsed (step S504). On the other hand, when it is possible to obtain a sort printing semaphore, the CPU 204 obtains a sort printing semaphore and restricts reception of other PDL jobs (step S505), and based on the sort printing mode 303 in the PDL job 300, determines whether or not the sort printing mode is selected (step S506). It should be noted that the predetermined time period in the step S504 is stored in the ROM 205 in advance.

As a result of the determination in the step S506, when the sort printing mode is selected, the CPU 204 starts storing the PDL job 300 in the storage area 400 (step S507). On the other hand, when the sort printing mode is not selected, the CPU 204 releases the sort printing semaphore to allow reception of other PDL jobs (step S508), followed by the process proceeding to the step S507. The CPU 204 then determines whether or not the whole of the PDL job 300 has been stored in the storage area 400 (step S509).

As a result of the determination in the step S509, when the whole of the PDL job 300 has not been stored in the storage area 400, the process returns to the step S507, and when the whole of the PDL job 300 has been stored in the storage area 400, the process is terminated.

According to the process in FIG. 5, when a sort printing semaphore is obtained, and the sort printing mode is selected (steps S505 and S506), reception of other PDL jobs is restricted. This prevents a shortage of the free space of the storage area 400 in the image forming apparatus 101 during sort printing and allows execution of the PDL job 300. When the sort printing mode is not selected for the PDL job 300, and a sort printing semaphore is released (steps S506 and S508), reception of other PDL jobs is allowed. As a result, other PDL jobs are smoothly received, and hence PDL jobs are efficiently executed.

Figure 6:
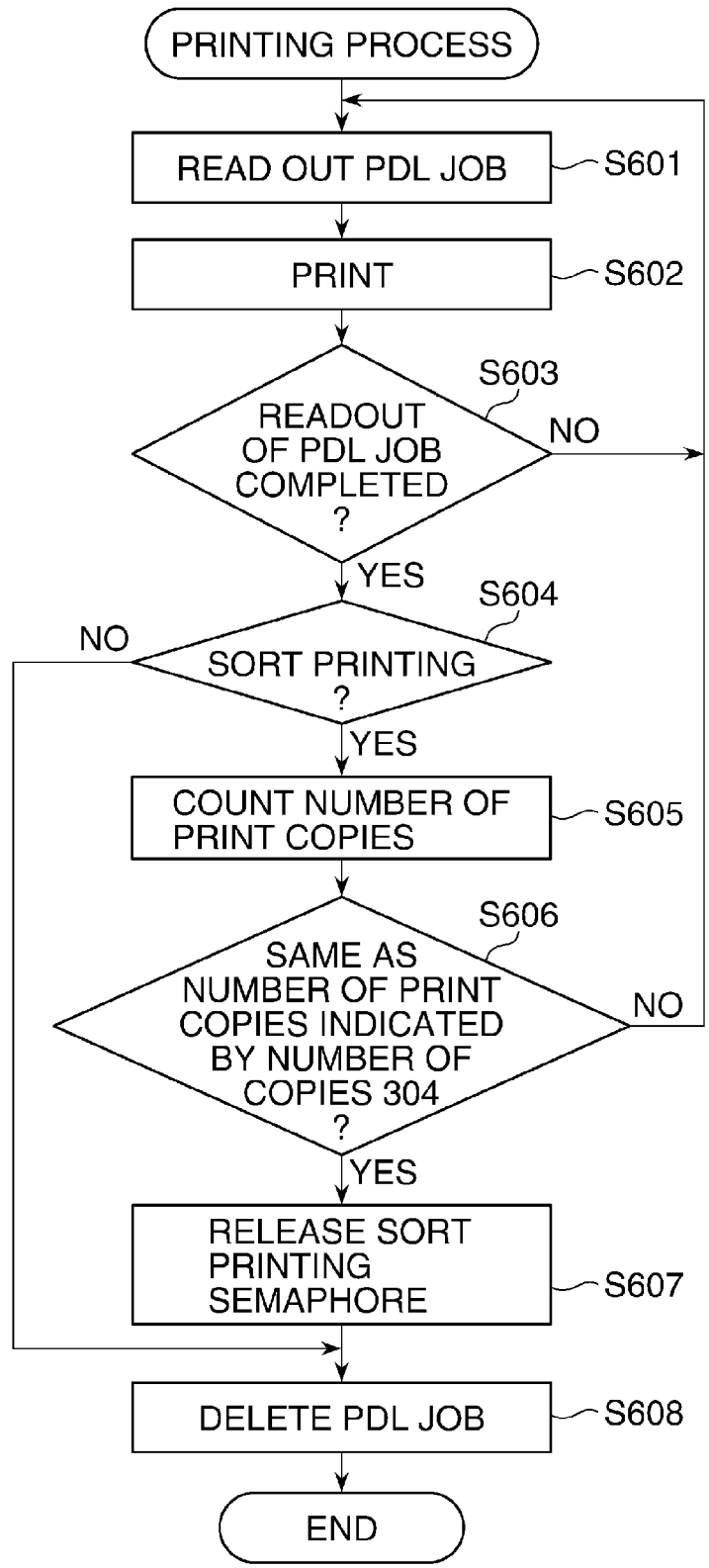
FIG. 6 is a flowchart showing a printing process in which bitmap data generated based on the PDL job received in the receiving process in FIG. 5 is printed.

FIG. 6 is a flowchart showing a printing process in which bitmap data generated based on the PDL job 300 received by the receiving process in FIG. 5 is printed. The process in FIG. 6 is carried out by the CPU 204.

Referring to FIG. 6, first, in response to storage of the PDL job 300 in the storage area 400 being started in the step S507 described above, the CPU 204 reads out the PDL job 300 from the storage area 400 (step S601). The CPU 204 then expands the read PDL job 300 to generate intermediate data from PDL data stored in the data section 302, the rendering unit 211 generates bitmap data from the intermediate data, and the print engine 202 prints the bitmap data on a recording sheet (step S602). The CPU 204 then determines whether or not readout of the PDL job 300 from the storage area 400 has been completed (step S603).

As a result of the determination in the step S603, when readout of the PDL job 300 has not been completed, the process returns to the step S601, and when readout of the PDL job 300 has been completed, the CPU 204 then determines whether or not the sort printing mode is selected based on the sort printing mode 303 (step S604). As a result of the determination in the step S604, when the sort printing mode is not selected, the CPU 204 deletes the PDL job 300 from the storage area 400 (step S608) and terminates the process. On the other hand, when the sort printing mode is selected, the CPU 204 counts the number of print copies of printed matter, that is, the number of recording sheets on which bitmap data has been printed (step S605) and determines whether or not the counted number of print copies of printed matter matches the number of print copies indicated by the number of copies 304 (step S606).

As a result of the determination in the step S606, when the counted number of print copies of printed matter matches the number of print copies indicated by the number of copies 304, the CPU 204 releases the sort printing semaphore (step S607), followed by the process proceeding to step S608, and when the counted number of print copies of printed matter does not match the number of print copies indicated by the number of copies 304, the process returns to the step S601.

According to the process in FIG. 6, in response to storage of the PDL job 300 in the storage area 400 being started in the step S507, a predetermined size of data in the PDL job 300 stored in the storage area 400 is read out (step S601). Therefore, a printing process is allowed to be started before the whole of the PDL job 300 is stored in the storage area 400, and as a result, the printing process is quickly completed.

Figure 7:
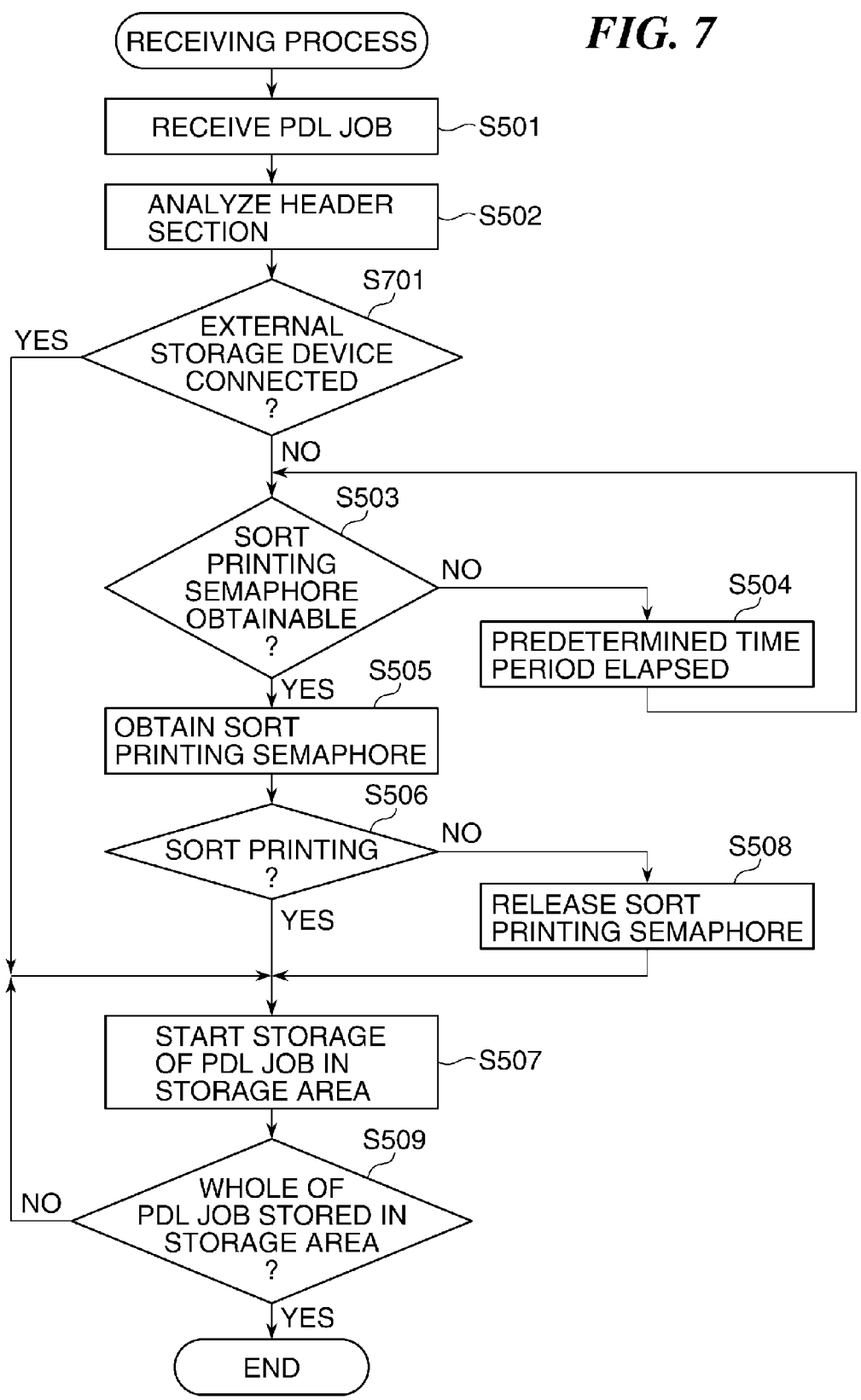
FIG. 7 is a flowchart showing the procedure of a variation of the receiving process in FIG. 5.

FIG. 7 is a flowchart showing the procedure of a variation of the receiving process in FIG. 5. Processes in steps S501 to S509 in FIG. 7 are the same as those in the steps S501 to S509 in FIG. 5, and therefore, only features different from the processes in FIG. 5 will be described below.

After carrying out the process in the step S502, the CPU 204 determines whether or not an external storage device is connected to the external storage device I/F 212 (step S701). As a result of the determination in the step 701, when an external storage device is connected to the external storage device I/F 212, the process proceeds to the step S507 without obtaining a sort printing semaphore with the steps S503 to S506 and S508 skipped, and in the step S507, storage of the PDL job 300 in the storage area 400 is started. When no external storage device is connected to the external storage device I/F 212, the process proceeds to the step S503.

According to the process in FIG. 7, when an external storage device is connected to the external storage device I/F 212, storage of the PDL job 300 in the storage area 400 is started (step S507) without obtaining a sort printing semaphore (step S701), and hence reception of other print jobs is not restricted (restriction on reception is disabled). In other words, even when the sort printing mode is selected for the PDL job 300, other print jobs are received when an external storage device is connected to the external storage device I/F 212. As a result, other print jobs are smoothly received, and hence the PDL job 300 and other print jobs are more efficiently executed.

A description will now be given of a second embodiment of the present invention.

The second embodiment of the present invention is basically the same as the first embodiment described above in terms of constructions and operations, differing from the first embodiment in that whether or not to receive the PDL job 300 depends on whether or not the amount of the PDL job 300 is greater than the free space of the storage area 400. Features of constructions and operations that are the same as those in the first embodiment will not be described, only constructions and operations different from those of the first embodiment being described below.

Figure 8:
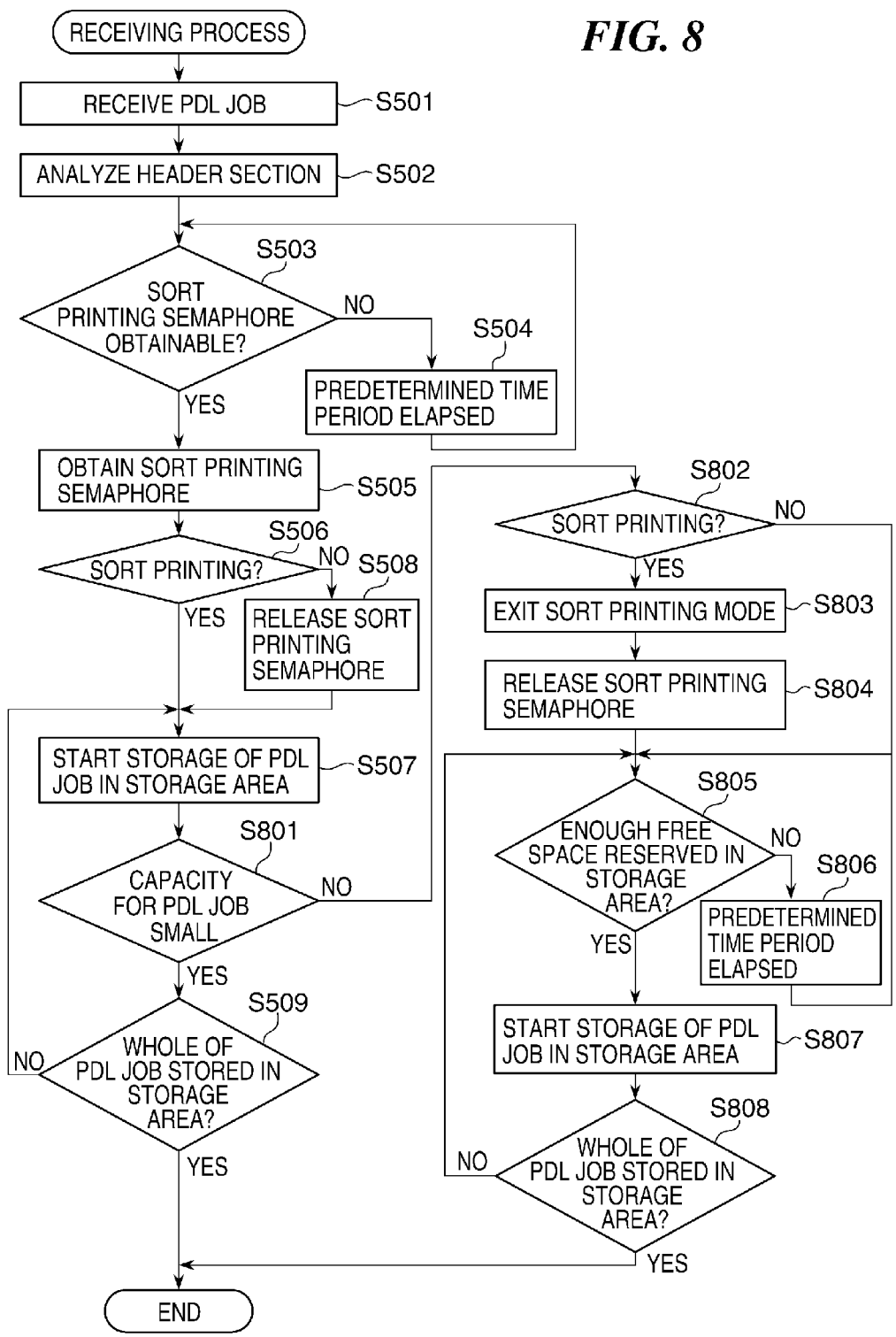
FIG. 8 is a flowchart showing the procedure of a receiving process which is carried out by the CPU of the image forming apparatus in FIG. 2.

FIG. 8 is a flowchart showing the procedure of a receiving process which is carried out by the CPU 204 of the image forming apparatus in FIG. 2. Processes in steps S501 to S509 in FIG. 8 are the same as those in the steps S501 to S509 in FIG. 5, and therefore, only features different from the processes in FIG. 5 will be described below.

After carrying out the process in the step S507, the CPU 204 determines whether or not a space required to print a plurality of copies of bitmap data generated from the PDL job 300 is smaller than a free space of the storage area 400 (step S801). As a result of the determination in the step 801, when a space required to print a plurality of copies of the bitmap data is smaller than a free space of the storage area 400, the process proceeds to the step S509, and when a space required to print a plurality of copies of the bitmap data is greater than a free space of the storage area 400, the CPU 204 determines whether or not the sort printing mode is selected based on the sort printing mode 303 (step S802).

As a result of the determination in the step S802, when the sort printing mode is selected, the CPU 204 decreases the number of print copies indicated by the number of copies 304 to one and deselects the sort printing mode (step S803) and releases the sort printing semaphore (step S804). In the present embodiment, when the sort printing mode is deselected in the step S803, the reading and discarding mode is selected in a process in step S903 in FIG. 9, to be described later. When the sort printing mode is deselected, the CPU 204 does not store the whole of the PDL job 300 in the storage area 400 at a time but successively stores pieces of the PDL job 300 in the storage area 400, and when the reading and discarding mode is selected, the CPU 204 successively deletes pieces of the PDL job 300, of which reading has been completed, from the storage area 400, causing a free space of the storage area 400 to increase.

The CPU 204 then determines whether or not a free space large enough to store the subsequent piece of the PDL job 300 has been reserved in the storage area 400 (step S805). As a result of the determination in the step S805, when enough free space has not been reserved in the storage area 400, the process returns to the step S805 after the free space of the storage area 400 has increased with the lapse of a predetermined time period (step S806). When enough free space has been reserved in the storage area 400, the CPU 204 starts storing the subsequent piece of the PDL job 300 in the storage area 400 (step S807) and determines whether or not the whole of the PDL job 300 has been stored in the storage area 400 (step S808).

As a result of the determination in the step S808, when the whole of the PDL job 300 has been stored in the storage area 400, the process is terminated. On the other hand, when the whole of the PDL job 300 has not been stored in the storage area 400, the process returns to the step S805. As a result of the determination in the step S802, when the sort printing mode is not selected, the process proceeds to the step S805 with the steps S803 and S804 skipped.

According to the process in FIG. 8, when a space required to print a plurality of copies of the bitmap data is greater than a free space of the storage area 400 (NO in the step S801), the number of print copies indicated by the number of copies 304 of the PDL job 300 is decreased to one, and the sort printing mode is deselected (step S803). This eliminates the need to continuously store the whole of the PDL job 300 in the storage area 400 until printing of the bitmap data is completed. This prevents a shortage of the free space of the storage area 400 to smoothly receive the PDL job 300, and as a result, the PDL job 300 is efficiently executed.

Figure 9:
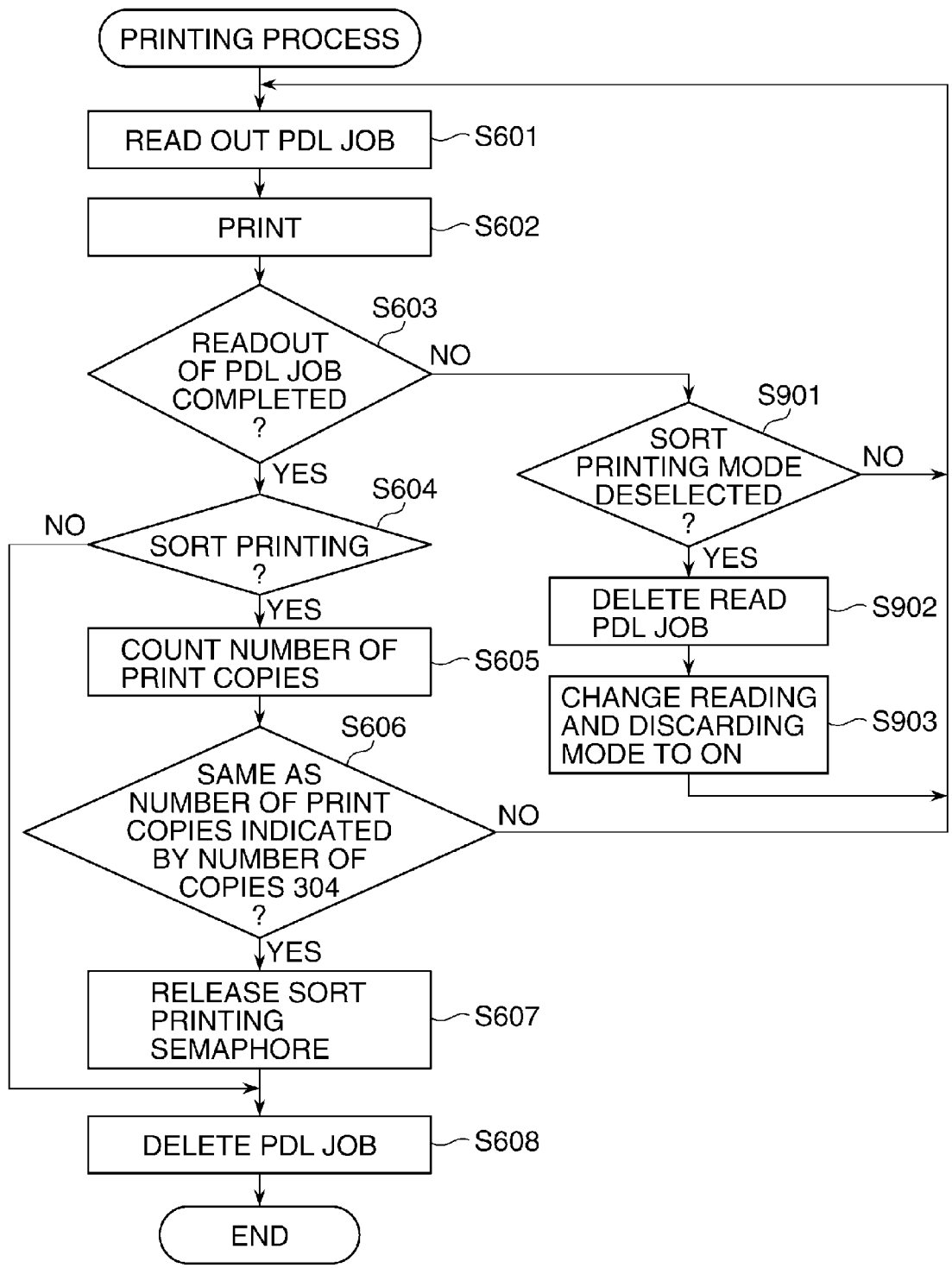
FIG. 9 is a flowchart showing the procedure of a printing process in which bitmap data generated based on the PDL job received in the receiving process in FIG. 8 is printed.

FIG. 9 is a flowchart showing the procedure of a printing process in which bitmap data generated based on the PDL job 300 received in the receiving process in FIG. 8 is printed. The printing process in FIG. 9 is carried out by the CPU 204. Processes in steps S601 to S608 in FIG. 9 are the same as those in the steps S601 to S608 in FIG. 6, and therefore, only features different from the processes in FIG. 6 will be described below.

As a result of the determination in the step S603, when readout of the PDL job 300 has not been completed, the CPU 204 determines whether or not sort printing was deselected in the step S803 described above (step S901). As a result of the determination in the step S901, when sort printing was not deselected, the process returns to the step S601. On the other hand, when sort printing was deselected, the CPU 204 deletes the read PDL job 300 from the storage area 400 (step S902) and selects the reading and discarding mode (step S903), followed by the process returning to the step S601.

According to the process in FIG. 9, when sort printing is deselected, the read PDL job 300 is deleted from the storage area 400 (step S902), and as a result, a free space is reserved in the storage area 400 at the right time.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-183301, filed Sep. 9, 2014, which is hereby incorporated by reference herein in its entirety.

What is claimed is:

1. An image forming apparatus that receives a first print job and a second print job which is started to be received later than the first print job and performs a print process of a plurality of copies of print data corresponding to the first print job, comprising:
    a memory for storing the received first print job and the received second print job; and
    at least one processor connected to the memory and configured to:
        determine whether the print data is to be printed by a sort printing method;
        based on the determination that the print data is to be printed by the sort printing method, restrict a receiving process of reception and storage into the memory of the second print job until at least a receiving process of reception and storage into the memory of the first print job for the print process is completed so that the storage of the second print job is impossible before at least completion of the receiving process of the first print job; and
        based on the determination that the print data is not to be printed by the sort printing method, not perform the restriction of the receiving process of the second print job so that the storage of the second print job is possible before completion of the print process of the print data.

2. The image forming apparatus according to claim 1, wherein the at least one processor is further configured to have an external storage device connected thereto, and wherein the restriction is disabled when the external storage device is connected.

3. The image forming apparatus according to claim 1, wherein the at least one processor is configured to:
receive the first print job which is to be printed by the sort printing method;
based on the reception of the first print job, start performing the restriction; and
based on the completion of the print process of the plurality of copies of the print data by the sort printing method, release the restriction in order to receive the second print job.

4. A control method for an image forming apparatus that receives a first print job and a second print job which is started to be received later than the first print job and performs a print process of a plurality of copies of print data corresponding to the first print job, comprising:
determining whether the print data is to be printed by a sort printing method;
based on the determination that the print data is to be printed by the sort printing method, restricting a receiving process of reception and storage into the memory of the second print job until at least a receiving process of reception and storage into the memory of the first print job for the print process is completed so that the storage of the second print job is impossible before at least completion of the receiving process of the first print job; and
based on the determination that the print data is not to be printed by the sort printing method, not performing the restriction of the receiving process of the second print job so that the storage of the second print job is possible before completion of the print process of the print data.

5. A method for controlling an image forming apparatus, comprising:
starting receiving a print job, the received print job being stored into a memory;
after the starting of the reception of the print job, starting a prohibition process of prohibiting reception of another print job so that at least print data of the another print job is prohibited from being stored in the memory during the prohibition process;
determining whether or not the received print job is a print job where a plurality of copies is printed by a sort printing method;
based on the determination that the received print job is the print job where a plurality of copies is printed by the sort printing method, performing a print process of the plurality of copies of the received print job by the sort printing method and continuing the prohibition process until at least completion of storage of the received print job into the memory; and
after at least the completion of the storage of the received print job, stopping the prohibition process in order to receive the another print job.

6. The method according to claim 5, further comprising:
based on the determination that the received print job is not the print job where a plurality of copies is printed by the sort printing method, stopping the prohibition process even before the completion of the storage of the received print job in order to receive another print job during performing of the print process of the received print job.

7. The method according to claim 5, wherein the starting and the stopping of the prohibition process is performed by utilizing a semaphore.

8. The method according to claim 7, wherein the starting of the prohibition process is performed by acquiring the semaphore, and the stopping of the prohibition process is performed by releasing the semaphore.

9. The method according to claim 5, further comprising:
determining whether or not an external storage medium is attached to the image forming apparatus; and
based on the determination that the external storage medium is attached to the image forming apparatus, not starting the prohibition process.

10. An image forming apparatus which receives first print data and second print data, comprising:
a memory; and
one or more processors configured to function as:
a determination unit configured to determine whether or not the first print data is to be printed by a sort print process in which print data is received to be stored into the memory and read out from the memory repeatedly to print multiple copies copy by copy; and
a reception unit configured to receive the first print data to store the first print data into the memory,
wherein the reception unit is further configured to:
based on the determination that the first print data is not to be printed by the sort print process, be able to receive, during the reception and storage of the first print data, the second print data to store the second print data into the memory, and
based on the determination that the first print data is to be printed by the sort print process, perform control to receive, at least after completion of the reception and storage of the first print data, the second print data to store the second print data into the memory.

11. The image forming apparatus according to claim 10, wherein the determination unit is further configured to perform the determination by checking header information of the first print data, the header information and the first print data being different.

12. The image forming apparatus according to claim 11, wherein the header information is capable of including information indicating whether the first print data is to be printed by the sort print process.

13. The image forming apparatus according to claim 11, wherein the determination unit is further configured to perform the checking of the header information of the first print data before the storage of the first print data.

14. The image forming apparatus according to claim 10, wherein the reception unit is further configured not to perform the control if an extra memory is connected to the image forming apparatus.

15. The image forming apparatus according to claim 10, wherein the determination unit is further configured to perform the determination before the storage of the first print data.

16. A method of receiving first print data and second print data, comprising:
determining whether or not the first print data to be received is to be printed by a sort print process in which print data is received to be stored into a memory and read out from the memory repeatedly to print multiple copies copy by copy;
receiving the first print data to store the first print data into the memory;
based on the determination that the first print data is not to be printed by the sort print process, enabling receiving, during the reception and storage of the first pint data, the second print data to store the second print data into the memory; and based on the determination that the first print data is to be printed by the sort print process, performing control to receive the second print data to store the second print data into the memory at least after completion of the reception and storage of the first print data.

17. The method according to claim 16, wherein the determination is performed by checking header information of the first print data, the header information and the first print data being different.

18. The method according to claim 17, wherein the header information is capable of including information indicating whether the first print data is to be printed by the sort print process.

19. The method according to claim 17, wherein the checking of the header information of the first print data is performed before the storage of the first print data.

20. The method according to claim 16, wherein if an extra memory is available, the control is not performed and the reception, during the reception and storage of the first print data, of the second print data to store the second print data into the memory is enabled.

21. The method according to claim 16, wherein the determination is performed before the storage of the first print data.

* * * * *